Feb. 21, 1939.  C. S. KNIGHT  2,147,792
FILTER
Filed April 9, 1937
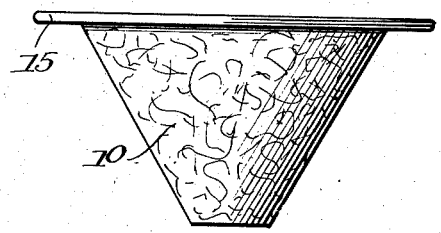
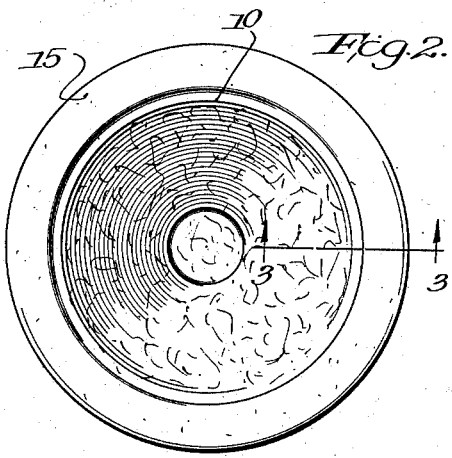
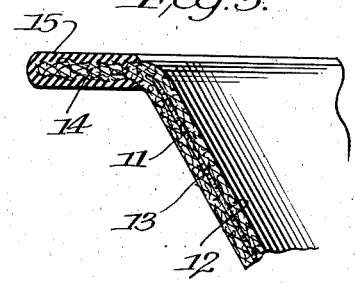
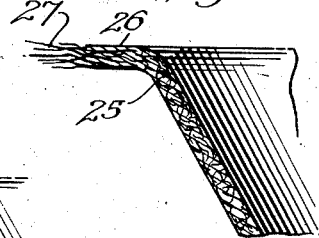
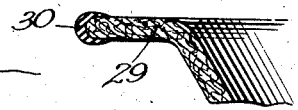
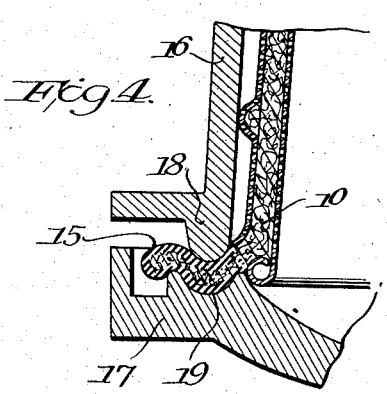
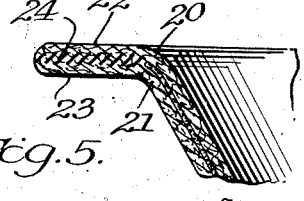
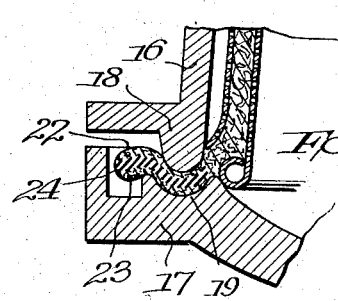
Inventor
Charlotte S. Knight.
By
Attorneys Patented Feb. 21, 1939

2,147,792

UNITED STATES PATENT OFFICE 2,147,792

FILTER

Charlotte S. Knight, New York, N. Y., assignor of three-fourths to Zella F. Campbell Application April 9, 1937, Serial No. 136,015

14 Claims. (Cl. 210—204)

The present invention relates generally to the manufacture of pads or layers of fibrous material and more particularly to the production of filter mediums formed of asbestos or other fibrous material.

The primary object of the invention is the treatment of filter layers or mediums to insure that they are entirely leakproof when clamped in a filter casing. In my copending application, for Filter medium and method of forming the same, Serial No. 35,013, filed August 6, 1935, I disclose one means of sealing the marginal portions of a multi-layer filter. This is accomplished by making one layer of greater diameter than the other and then folding the marginal portions of this layer over the edges of the other layer. This binds the layers together and forms a filter which may be economically used for a considerable period particularly when used in connection with a filter casing of the type disclosed in my Patent No. 2,042,106, May 26, 1936. In this structure, the two part filter casing is provided with a cooperating rib and groove between which the marginal portions of the filter medium are clamped. The clamping action bodily flexes the medium whereby the fibers at the surface portions thereof will be compressed more compactly than at the center, that is, the fibers at the surfaces will be of greater density than those at the center of the layer or layers. I have discovered that while a filter formed in this manner is quite efficient, it nevertheless requires that considerable pressure be applied to the clamping mechanism to insure against leakage through the less densely packed central portion. This necessitates substantially heavy and expensive clamping mechanism.

The present invention is for the purpose of forming a filter medium which will effectively prevent leakage without utilizing heavy clamps or applying excessive clamping pressure. This I accomplish by treating or otherwise protecting the marginal portions of the filter medium with a material which has the necessary characteristics of being impervious to liquid and at the same time being flexible, so as not to interfere with the clamping action of the rib and groove. As one example, I have found that a solution of latex forms an efficient agent, as it is entirely impervious to liquid and also retains the flexibility of the filter layer or layers after being dried or cured. This solution may be applied in numerous ways, a few of which are illustrated in the accompanying drawing in which:

Figure 1 is a side elevation of one form of my invention;

Figure 2 is a top plan view thereof;

Figure 3 is an enlarged fragmentary sectional view thereof;

Figure 4 is a sectional view showing the filter medium applied to a filter casing;

Figure 5 is a modified form of the invention;

Figure 6 is a view showing the filter medium of Figure 5 applied to a filter casing;

Figure 7 discloses a step in the formation of a further modification of the filter medium;

Figure 8 discloses the completed filter medium of Figure 7, and

Figure 9 discloses a still further modification.

Referring now to the drawing and particularly to Figures 1, 2 and 3, there is disclosed a filter medium 10 formed preferably in the manner disclosed in my above mentioned copending application Serial No. 35,013. This medium may be formed of separate layers 11 and 12 with an intermediate layer of carbon 13, or it may comprise a single layer of asbestos or other fibers. If the medium is to comprise a multi-layer filter element, then the two layers 11 and 12 will be of the same diameter, as distinguished from the filter of my copending application wherein one of the layers is of greater diameter than the other so that its marginal portions may be folded about the other layer to form a seal.

In the present arrangement, I have disclosed the filter medium as being of cup shape having a flat marginal portion 14 but this medium may, of course, be made in the form of a flat mat if desired. After the filter medium has been formed either in single or multi-layer formation, I then apply by any suitable means, a coating 15 of a latex solution or other suitable material to both sides of the flat marginal portions and also to the extreme edge portions of the layer or layers. In other words, the coating entirely surrounds the flat marginal portion of the filter medium, as clearly shown in Figure 3.

I prepare the coating solution in such a manner that it may be easily and quickly applied to the layer or layers. Furthermore, the solution is so treated that it may be quickly dried and at the same time, maintain its flexibility. The solution will, while forming a distinct layer or coating, nevertheless adhere to, and more or less permeate, the outer surfaces of the asbestos or other fibers with which it contacts. In other words, it interlocks with the asbestos fibers, and forms therewith a unitary layer which is not only impervious to liquid but also maintains the flexibility of the filter medium.

In Figure 4, the filter medium of Figures 1 to 3 is shown clamped between the sections 16 and 17 of the filter casing disclosed in my Patent No. 2,042,106. The upper section 16 is provided with a rib 18 while the lower section has formed therein, a cooperating groove 19. When the two sections are clamped together, they will bodily flex the marginal portions of the filter medium and form an efficient seal. By reason of the coating solution maintaining its flexibility, it will be bodily flexed as an integral portion of the medium. In view of the fact that the coating entirely surrounds the marginal portions of the filter medium and extends sufficiently inwardly to be clamped between the rib and groove, it forms a perfect seal which effectively traps any fluid that might eventually leak through the central portion of the medium, and prevents it from escaping to the outside of the filter casing.

It is to be understood that the filter medium comprising the subject matter of my copending application Serial No. 35,013 is entirely satisfactory and when applied to a filter casing having the rib and groove arrangement disclosed in my Patent 2,042,106, it forms an efficient leak-proof seal. The present invention is primarily for the purpose of providing a filter medium which does not require as great a clamping pressure as my former medium and consequently does not require as heavy a clamp as that which is necessary for my other medium.

In Figures 5 and 6, I have disclosed a modification in which the filter medium is made up of at least two layers 20 and 21. With this form of the device, after these layers are placed in contacting relation, the flat marginal portions 22 and 23 are separated sufficiently to permit the introduction of a layer of the latex or other solution. As in the other form, this may be applied in any desired manner such as by spraying, dipping, rollers, etc., and then the two layers are clamped together until the liquid repellant layer 24 has been sufficiently dried. This solution will penetrate the fibers of each layer 22 and 23 somewhat and effectively bind the several layers into a unitary filter medium. In this form of the invention the solution may be applied before the layers 20 and 21 are pressed together, that is, it may be applied to the marginal portions of either one or both layers and then the two layers pressed together. It is to be understood that this method may be used in forming a filter medium of three or more layers if desired. The solution may be applied either between adjacent layers or to each individual layer as desired.

In Figure 6, the filter medium of Figure 5 is shown clamped between the filter sections 16 and 17, and in the same manner as that described above, the rib 18 and groove 19 will bodily flex and compress the filter between the casing sections. In this clamped position, the fibers adjacent the outer surfaces will be sufficiently dense to prevent any seepage of liquid through these portions of the filter. The center portion of the filter medium being composed of the latex or other liquid repellant layer, will not be open to the attack of the liquid and will effectively repel the escape of such liquid. This combination of the densely compacted outer fibrous portions and the intermediate water repellant portion therefore creates an effective seal which, similarly to the form shown in Figures 1 to 4, prevents the escape or leakage of fluid from the interior of the filter casing.

In Figures 7 and 8, there is disclosed a further form of my invention wherein the filter medium comprises a single layer 25 of asbestos or other fibers. This layer may be formed by the process disclosed in my copending application Serial No. 35,013 but during the formation of the flat marginal portion 26, means are provided to prevent the completion of this portion of the layer. That is, it is maintained in an unfinished uneven condition preferably with some of the longer asbestos fibers extending outwardly as at 27 to form a base or foundation. With the filter medium in this stage of preparation, I prepare a solution of water repellant material either unmixed or mixed with another material, such as short asbestos fibers or processed clay and then apply this preparation to the unfinished flat marginal portion or base 27. The long fibers will intimately retain and positively lock the mixture or preparation to the rest of the layer, as shown in Figure 8. Thus, the greater portion of the layer will be formed of asbestos or other fibers, while the flat marginal portion will be formed of the preparation 28 which mixture will be so interspersed in the long fibers 27 as to provide a unitary filter medium. As stated above, this layer may be formed in the manner disclosed in my above noted application. During the application of the preparation care should be taken to prevent the mixture from being applied to other than the flat marginal portion 26 of the layer. After the layer has been completed, the marginal portion 28 will be of substantially the same flexibility as the remainder of the layer so that when clamped between the filter casing sections 16 and 17, it may be readily bodily flexed and compressed and at the same time constitute a liquid-tight seal and prevent the escape of any fluid from the interior of the filter casing. As a further modification, I have shown in Figure 9, a filter medium 29 consisting of one or more layers in which the latex or other solution utilized in the form shown in Figures 1 and 4, is applied substantially to the edge of the layer, as shown at 30. This arrangement is utilized in the event that a filter casing having substantially flat clamping flanges is utilized, these flanges extending to a point beyond the latex coating 30. This will form an effective seal, as the coating 30, being clamped between the flat flanges will constitute a waterproof wall and prevent the escape of fluid from the interior of the casing.

In each of the above forms the latex or other solution is described as being applied to the asbestos fibers and then allowed to dry. It is contemplated, if found desirable, to vulcanize the latex after being applied to the fibers, but such vulcanization will not affect the flexibility or the sealing qualities of the filter medium which may be used in the same manner that is above described. Furthermore, the invention also contemplates the use of any synthetic rubber solution as the water repellant coating to be applied to the layer or layers. In the claims the word "layer" is used broadly, that is, it may consist of a plurality of superposed sections which are used to make up the filter medium. Furthermore, the term "marginal portion" as recited in the claims is to be interpreted as meaning the extreme edge as well as any portion or surface which may extend inwardly from the edge of the layer.

It is to be understood that the form of the invention shown and described is merely illustrative of a preferred embodiment and that such changes may be made as fall within the purview of one skilled in the art without departing from the spirit of the invention and the scope of the appended claims.

I claim:

1. A filter medium comprising a flexible layer of fibrous material, and a substantially U-shaped coating of liquid repellant material enveloping the marginal portions of the layer without materially affecting the flexibility of the layer.

2. A filter medium comprising a plurality of flexible layers of fibrous material, the marginal portions of said layers having applied therebetween a layer of liquid repellant material which does not materially affect the flexibility of said layers of fibrous material.

3. A filter medium comprising a plurality of flexible layers of fibrous material, the marginal portions of said layers having applied therebetween a layer of latex which does not materially affect the flexibility of said layers of fibrous material.

4. A filter medium comprising a layer of flexible fibrous material having its marginal portions terminating in an unfinished uneven condition, and a liquid repellant material applied to said unfinished portion and forming therewith the completed filter medium having a liquid repellant and flexible marginal portion.

5. A filter medium comprising a layer of flexible fibrous material having its marginal portions terminating in an unfinished uneven condition, and a solution of latex and fibers secured to said unfinished portion and forming therewith the complete filter medium having a liquid repellant and flexible marginal portion.

6. A filter medium comprising a flexible layer composed of asbestos fibers having its marginal portions terminating in an unfinished condition with a plurality of relatively long asbestos fibers forming a base, and a mixture of latex and relatively short asbestos fibers applied to said long fibers and forming therewith the complete filter medium having a liquid repellant and flexible marginal portion.

7. The method of making a filter medium comprising forming a substantially flexible layer of fibrous material, and applying to a marginal portion of said layer a liquid repellant material in sufficient quantity to render the same impervious to liquid without materially affecting the flexibility of said marginal portion.

8. The method of making a filter medium comprising forming a substantially flexible layer of fibrous material, and applying to a marginal portion of said layer a solution of latex in sufficient quantity to render the same impervious to liquid without materially affecting the flexibility of said marginal portion.

9. The method of making a filter medium comprising forming a substantialy flexible layer of fibrous material and leaving its marginal portions in an unfinished condition, and applying to the unfinished portions of said layer a liquid repellant material in sufficient quantity to render the same impervious to liquid without materially affecting the flexibility of the layer.

10. The method of making a filter medium comprising forming a substantially flexible layer of fibrous material and leaving its marginal portions in an unfinished condition, and applying to the unfinished portions of said layer a mixture of latex and fibers in sufficient quantity to render the same impervious to liquid without materially affecting the flexibility of the layer.

11. A filter medium comprising a substantially flexible layer of fibrous material, a marginal portion of which layer is treated with a substantially impermeable liquid repellant material in sufficient quantity to render the same impervious to liquid, without materially affecting the flexibility of said marginal portion.

12. A filter medium comprising a substantially flexible layer of fibrous material, a marginal portion of which layer is treated with a substantially impermeable solution of latex in sufficient quantity to render the same impervious to liquid without materially affecting the flexibility of said marginal portion.

13. A filter medium comprising a substantially flexible layer of fibrous material, a marginal portion of which layer is treated with a substantially impermeable liquid repellant material in sufficient quantity to render the same impervious to liquid without materially affecting the flexibility of said marginal portion, said treated marginal portion being resistant to disintegration under high pressure.

14. A filter medium comprising a substantially flexible layer of fibrous material, and a coating of liquid repellant material applied to the margin of at least one surface of the layer in sufficient quantity to render the same impervious to liquid without materially affecting the flexibility of said margin.

CHARLOTTE S. KNIGHT.